Patented Oct. 21, 1952

2,615,026

UNITED STATES PATENT OFFICE 2,615,026

PROCESS FOR PRODUCING NONCRYSTALLIZING COPPER PHTHALOCYANINE

Lawrence D. Lytle, Plainfield, N. J., assignor to General Aniline & Film Corporation, New York, N. Y., a corporation of Delaware No Drawing. Application September 14, 1950, Serial No. 184,911

3 Claims. (Cl. 260—314.5)

This invention relates to a process for improving the physical properties of copper phthalocyanine.

Coloring matters of the phthalocyanine series, particularly the blue copper phthalocyanine, have tinctorial properties and light fastness qualities which recommend them particularly for use as pigments for paints, lacquers, and printing compositions. However, they are also subject to a tendency to flocculate and crystallize from the organic solvent employed as the vehicle. An initial crystallization generally occurs rather quickly after the copper phthalocyanine pigment has been thoroughly mixed with the solvent, and this is followed by a slower crystallization process upon further standing, resulting in considerable crystallization after one or two hours. This property has somewhat limited the use of this otherwise valuable coloring matter. When employed as a pigment for lacquer, for instance, it is difficult for the user to obtain the full color value, and the strength of the dyestuff may vary from day to day, resulting in shade and strength differences with the same supply of lacquer.

Numerous suggestions have been made to overcome this tendency of copper phthalocyanine to crystallize and flocculate. One such method is based upon the addition of tin phthalocyanine to copper phthalocyanine. In accordance with this method, the two phthalocyanine pigments may be pre-mixed or brought together for the first time by the paint mixer. Obviously, initial crystallization of the copper phthalocyanine would not be corrected by adding the tin phthalocyanine to a vehicle-mixed copper phthalocyanine for on-the-job control, and pre-mixing methods are limited in view of the fact that the tin phthalocyanine is unstable in sulfuric acid, with which copper phthalocyanine is generally pasted. Also, the addition of tin phthalocyanine has some modified effect on the shade of the copper phthalocyanine.

Another method contemplates the formation of an aluminum benzoate lake or compound pigment with the copper phthalocyanine. Physical mixtures of dry aluminum benzoate and dry copper phthalocyanine are not affected. Hence, the mixing must take place in the liquid or paste form, and the additional procedures and treatment inherent in the lake-forming process must be added to the copper phthalocyanine manufacture. Also, in this method the aluminum benzoate forming the sub-stratum of the lake or compound pigment has no color value. It, therefore, dilutes or diminishes the tinctorial strength of the copper phthalocyanine toner.

It is an object of the present invention to produce a non-crystallizing, non-flocculating, blue copper phthalocyanine pigment which may be employed in liquid pigmenting compositions without the necessity of adding other pigments or materials to stabilize against crystallization and flocculation. A non-crystallizing copper phthalocyanine may be said to be one which will show very few or no crystals upon standing 72 hours in a toluene solution.

I have found that non-halogenated copper phthalocyanine may be converted to a non-crystallizing form by heating it at high temperatures in the range of 140–180° C. in molten anhydrous aluminum chloride or a molten aluminum chloride-sodium chloride eutectic mixture. I am aware that halogenation of copper phthalocyanine has been carried out in aluminum chloride-sodium chloride melts in order to produce the green halogenated phthalocyanine. This invention does not contemplate the conversion of the blue non-halogenated copper phthalocyanine to the green halogenated copper phthalocyanine. Surprisingly, however, the same procedure used in effecting the halogenation of the copper phthalocyanine, but omitting the introduction of the halogenating agent, produces a conversion of the copper phthalocyanine to a form which does not crystallize. No halogenating agent other than the aluminum chloride which may introduce fractional amounts of chlorine is present during the treatment. The tinctorial, shading, light fastness, and other pigmenting properties are not affected, and a product is obtained which can be used as a pigment in paint, lacquer, and printing compositions without danger of crystallization in the organic solvent or other vehicle.

After the copper phthalocyanine has been heated in the anhydrous aluminum chloride or aluminum chloride-sodium chloride melt for a period of approximately two hours, it is drowned, filtered, washed neutral, and dried. The dry powder is then pasted with sulfuric acid, again washed neutral, and the pH adjusted with soda ash.

The following example will serve to more specifically illustrate the procedure, it being understood that the invention is not limited to the specific conditions or proportions of said example:

Example

A glass flask, fitted with a blade stirrer which produced very good agitation with a minimum of splashing, was charged with 720 grams aluminum chloride anhydrous and 151 grams dry sodium chloride. This charge was heated to 185-187° C. and held at this temperature until the charge was completely molten. It was then stirred and cooled to 140° C. 175 grams of copper phthalocyanine pigment were then added to the charge. The charge was stirred at 140-150° C. for two hours and then heated to 160-165° C. in about two hours.

The charge was then drowned in warm water, filtered, washed neutral, and dried.

A test sample was treated as follows: 50 grams of the dry powder was added to 800 grams 96% sulfuric acid at 5-10° C. and stirred for two hours until solution was complete. The acid solution was poured into 3,000 cc. water at 85-90° C. The precipitated color was filtered off and washed neutral. One-half of the cake, representing 25 grams dry color, was slurried in 500 cc. water and stirred until all lumps had broken down. The pH was adjusted to 10.0 with soda ash. Then 1.5 grams soda ash were added and 1.2 grams Gardinol were also added. The thus-treated sample was heated to 90-95° C. and stirred at this temperature for two hours, then filtered, washed neutral, and dried at 80° C. This sample was found to be practically non-crystallizing when dispersed in a solution of toluene.

I claim:

1. A process for the production of a non-crystallizing, non-flocculating copper phthalocyanine which consists in adding copper phthalocyanine to a melt of a member of the group consisting of anhydrous aluminum chloride and a mixture of anhydrous aluminum chloride and sodium chloride, agitating and heating the mixture to from 140° C. to 180° C. and recovering the copper phthalocyanine.

2. A process for the production of a non-crystallizing non-flocculating copper phthalocyanine which consists in melting a mixture of anhydrous aluminum chloride and sodium chloride while agitating the mixture, adding copper phthalocyanine to the melt at a temperature of 140° C. to 150° C., continuing agitation and heating to 160° C. and recovering the copper phthalocyanine by drowning the melt in water, filtering, washing neutral, and drying.

3. A process for the production of a non-crystallizing, non-flocculating copper phthalocyanine which consists in mixing anhydrous aluminum chloride and sodium chloride with agitation in the proportion of approximately 5 to 1, heating the mixture to 185° C. to 187° C., reducing the temperature to 140° C. when the charge is completely melted, adding copper phthalocyanine to the melt at a temperature of 140° C. to 150° C. in the proportion of 1 part of copper phthalocyanine to 4 parts of aluminum chloride, raising the temperature of the mixture while agitating to 160° C. and recovering the copper phthalocyanine by drowning the melt in water, filtering, washing neutral, and drying.

LAWRENCE D. LYTLE.

REFERENCES CITED

The following references are of record in the file of this patent:

FOREIGN PATENTS

| Number | Country | Date |
|---|---|---|
| 510,901 | Great Britain | Aug. 10, 1939 |
| 717,164 | Germany | Jan. 15, 1942 |